Sept. 13, 1966  R. W. GOODE  3,272,007
TENSION INDICATOR
Original Filed March 22, 1963  4 Sheets-Sheet 1
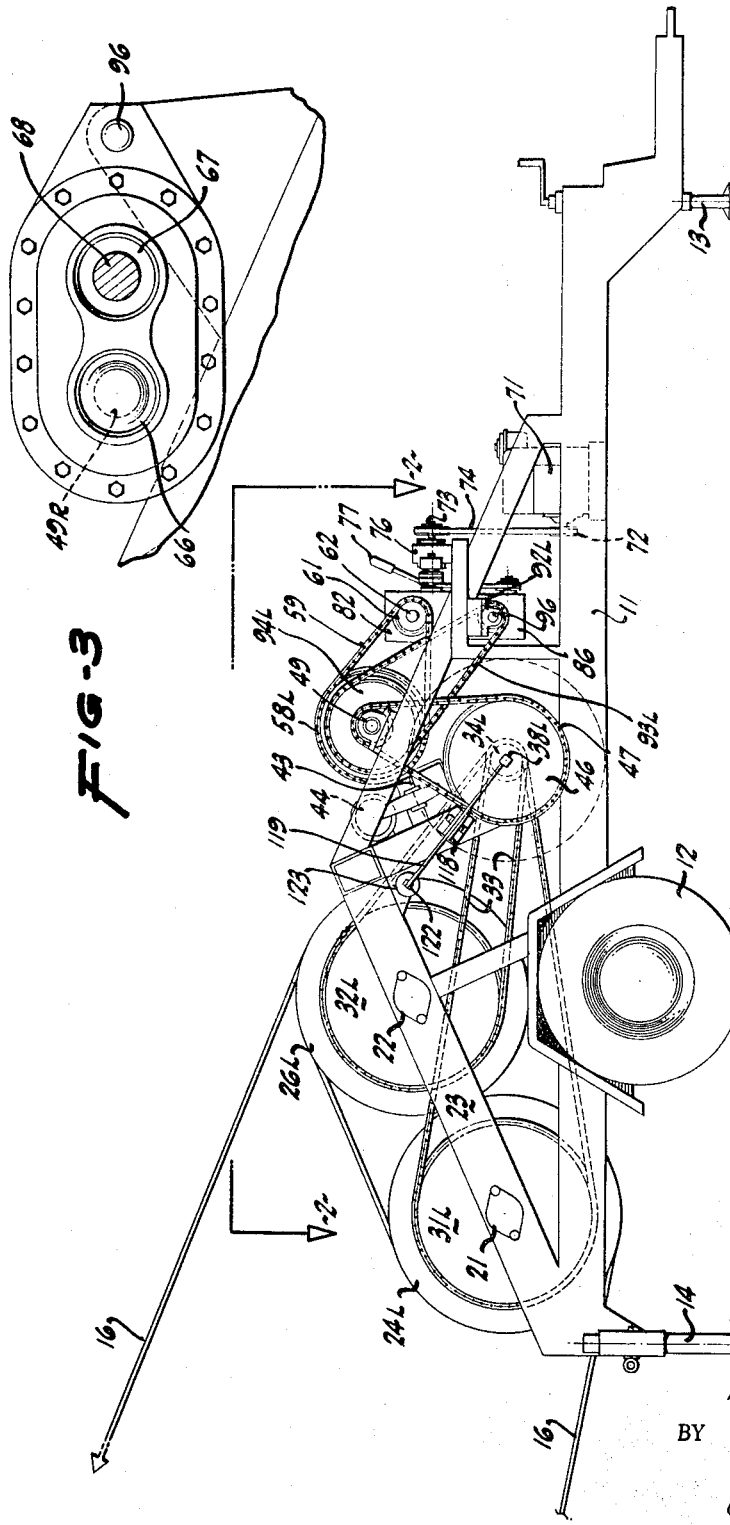
INVENTOR.
ROBERT W. GOODE
BY
Julian Caplan
ATTORNEY Sept. 13, 1966  R. W. GOODE  3,272,007
TENSION INDICATOR
Original Filed March 22, 1963  4 Sheets-Sheet 2
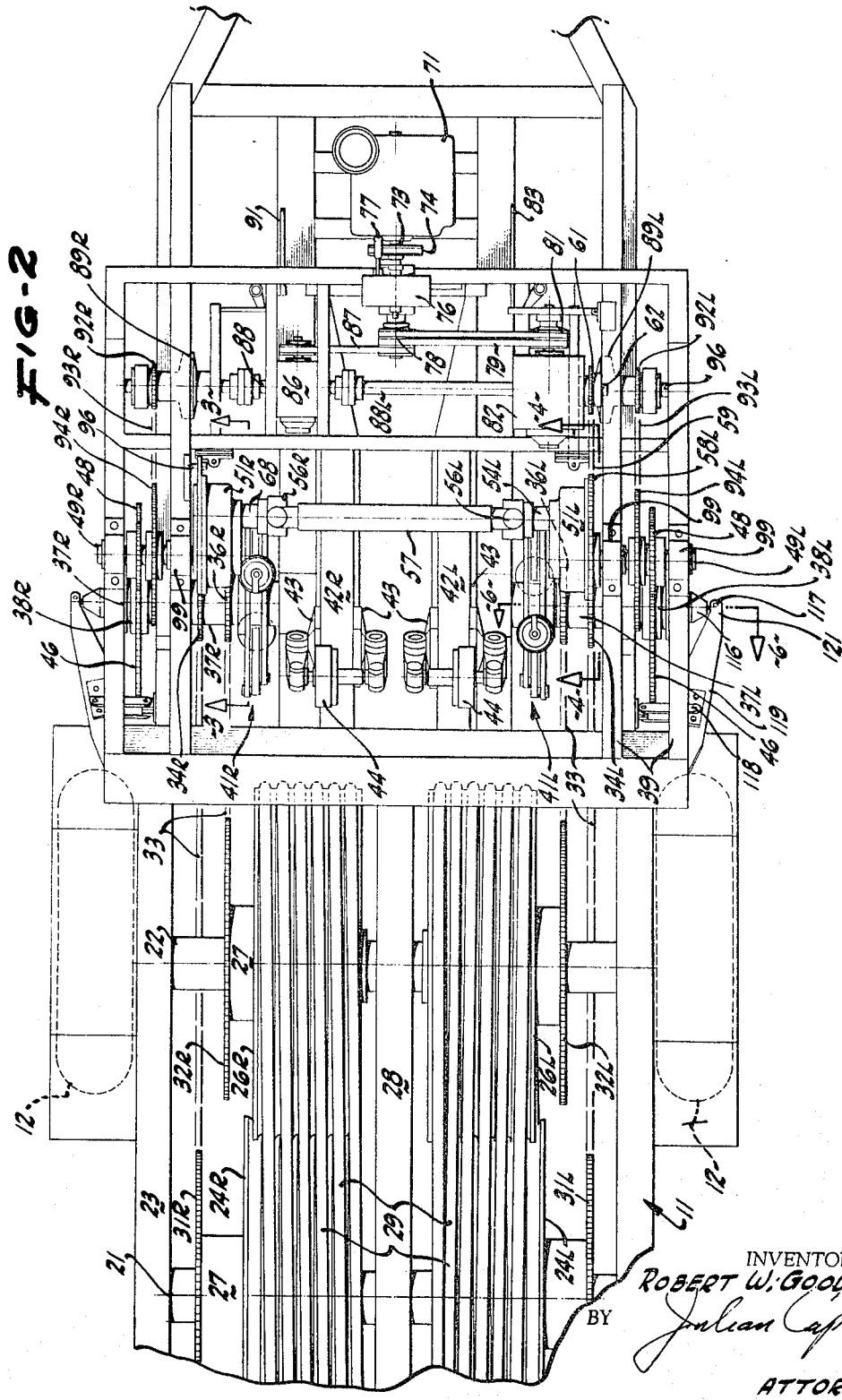
INVENTOR.
ROBERT W. GOODE
BY Julian Caplan
ATTORNEY Sept. 13, 1966 R. W. GOODE 3,272,007
TENSION INDICATOR
Original Filed March 22, 1963 4 Sheets-Sheet 3
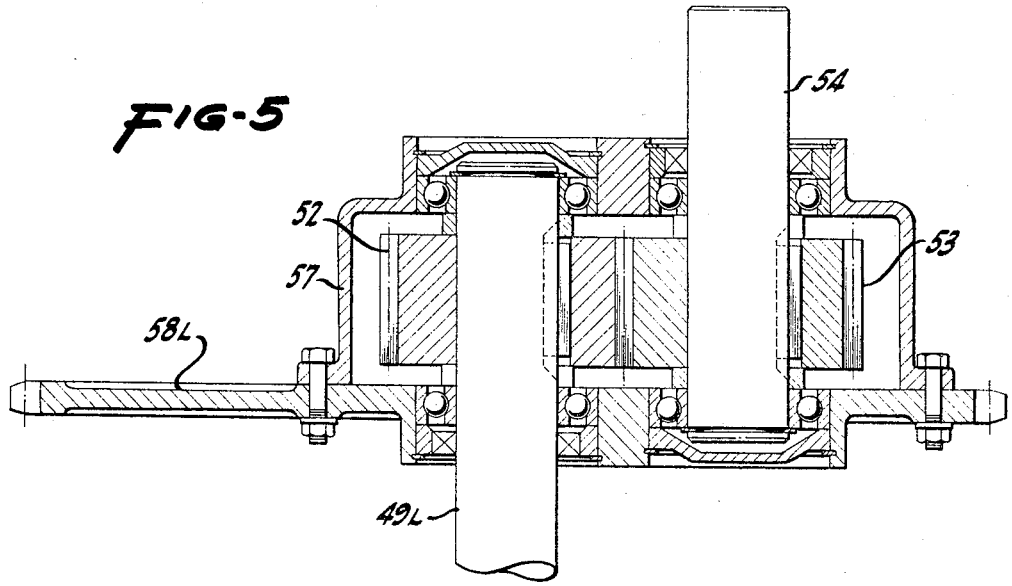
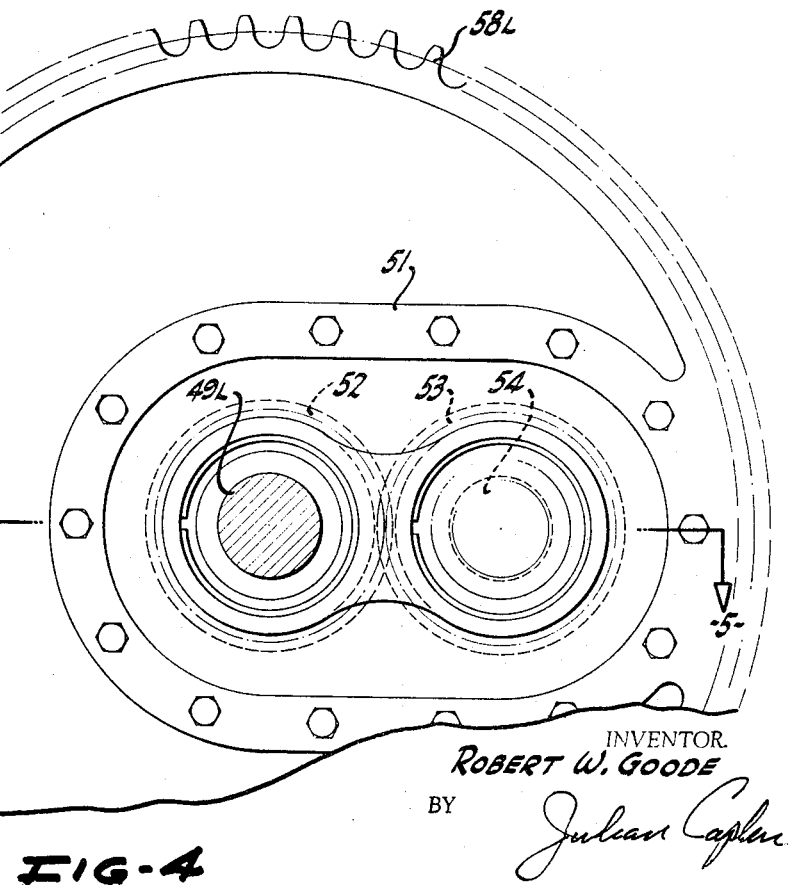
INVENTOR.
ROBERT W. GOODE
BY
Julian Caplan
ATTORNEY Sept. 13, 1966   R. W. GOODE   3,272,007
TENSION INDICATOR
Original Filed March 22, 1963   4 Sheets-Sheet 4

INVENTOR
ROBERT W. GOODE
BY Julian Caplan
ATTORNEY

United States Patent Office 3,272,007
Patented Sept. 13, 1966

3,272,007
TENSION INDICATOR
Robert W. Goode, Morgan Hill, Calif., assignor, by direct and mesne assignments, of one-half to Gerald A. Petersen, Santa Clara, Calif., and one-half to Anita E. Petersen, Saratoga, Calif.
Original application Mar. 22, 1963, Ser. No. 267,168, now Patent No. 3,241,817. Divided and this application May 11, 1964, Ser. No. 366,374
5 Claims. (Cl. 73—143)

This applicaton is a division of application Ser. No. 267,168, filed Mar. 22, 1963, now Patent No. 3,241,817.

This invention delates to a new and improved dual tensioner for stringing conductor cables and is characterized by the fact that the machine has a capacity for tensioning two or more conductors simultaneously and, further, may be adapted for use with a single conductor. Two or more pulling lines or cables are directed from the reels on which they are received from the factory around the bull wheels of the tensioner and thence through a plurality of sheaves on the cross arms of poles or towers and thence to a tension puller, which is power-driven and pulls a pulling line attached to the conductor under a predetermined tension. The bull wheels of the tensioner are connected to brake discs to which a braking force is applied, which insures that the pulling line and also the conductor to which the trailing end of the pulling line is attached is maintained at a constant predetermined tension.

Tension stringing of electrical conductors is a recent development whereby overhead lines are strung while the conductors are maintained in the air at all times to avoid damage. Ordinarily, a pulling line of wire rope is attached to the leading end of the conductor and is then run through stringing sheaves attached to the crossarms of the poles or towers. Any damage which may occur by reason of contact with the ground is absorbed by the pulling rope. In the course of the operation, a tension puller machine is attached at one end of the line and a tension braking machine at the opposite end. The bull wheel of the puller is equipped with power for turning with a force greater than the braking action at the other end of the line. If the equipment is properly operated, the conductor never touches the ground at any time during the stringing operation. Thus, damage to the conductor is avoided, which is of importance in that damage results in corona loss and also sets up radio interference when the conductor transmit high voltages. Furthermore, the use of tension stringing avoids obstructions, such as pre-existing power and telephone lines, roads, streets and railroad tracks which must be traversed by the line being strung. The present invention differs from previous tensioners in one respect in that it is intended for use primarily where two or more conductors are strung simultaneously.

A principal purpose of the present invention is to provide complete positive control of the linear payout of either line.

A still further feature of the invention is that the control of the linear payout of both lines is accomplished whether the lines are stationary or moving, it being understood that heretofore the only control over the lines has occurred when they were moving.

A still further feature of the invention is the provision of power means on the tensioner which may be used to turn the bull wheels to overcome static inertia at the commencement of the unwinding of the conductors or cable, or whenever for any reason the unwinding temporarily has stopped.

Another feature of the invention is the provision of power means for pulling in the tag ends of either or both conductors when the major portion thereof has been unwound and it is desired to salvage the remainder of a reel.

A primary purpose of the invention is the user of power means to sag or, alternatively, to create tension in either or both lines at the braking end thereof.

As hereinafter appears, the control is accomplished for each conductor independently of the other.

Other objects of the present invention will become apparent upon reading the following specification and referring to the accompanying drawings in which similar characters of reference represent corresponding parts in each of the several views.

In the drawings:

FIG. 1 is a side elevational view of a tensioner in accordance with the present invention.

FIG. 2 is a top plan of a portion thereof in enlarged scale as indicated by arrows 2—2 of FIG. 1.

FIG. 3 is an enlarged fragmentary sectional view taken substantially along the line 3—3 of FIG. 2.

FIG. 4 is an enlarged fragmentary sectional view taken substantially along the line 4—4 of FIG. 2.

FIG. 5 is a sectional view taken substantially along the line 5—5 of FIG. 4.

FIG. 8 is a fragmentary elevational view of a portion of the lever structure of the tension indicator or recorder.

Figure 7:
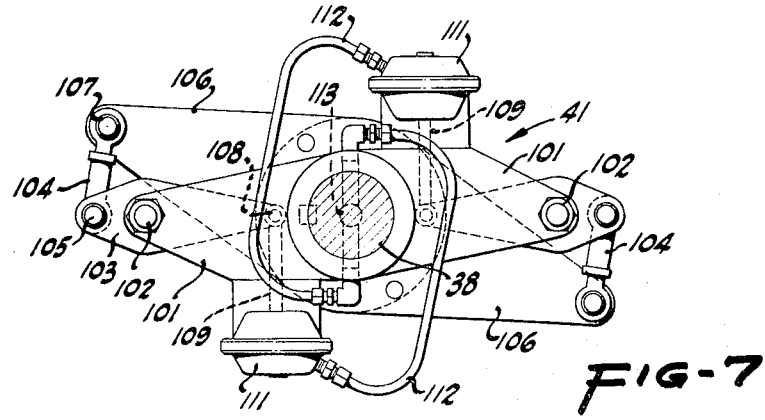
FIG. 7 is a sectional view taken substantially along the line 7—7 of FIG. 6.

The present invention provides a tensioner which, in accordance with the present invention, is mounted on a trailer frame 11, supported by ground wheels 12, held when stationary in level positions by means of a leveler 13 and supported against tilting by means of jack 14. It is assumed that two reels of pulling line such as wire rope or conductors, designated generally by reference numeral 16, are unwound from their reels (not shown but located to the left of FIG. 1) through the tensioner and thence directed upwardly to the first sheave (not shown) of the first pole or tower.

In accordance with the form of the invention illustrated herein, two conductors or pulling lines 16 are payed out under tension, but it will be understood that more than two conductors may be tensioned by expanding the machine in a manner which will readily occur to one skilled in this art. Further, where it is desired to use the equipment for a single conductor a portion of the equipment may be disconnected and held inoperative as hereinafter set forth. It will be further understood that at a remote location is a tension puller which pulls in the pulling line or conductor under power.

Rotatably mounted on transverse horizontal shafts 21, 22, journaled in frame members 23 of trailer 11 are lower and upper bull wheels 24L, 24R, 26L, 26R, wheels 24L, 24R being turnable about shaft 21 and wheels 26L, 26R about shaft 22. Longitudinal frame member 28 spaces the wheels apart. Each wheel is formed with a plurality of grooves 29, the grooves 29 of each of the pair of wheels being staggered relative to each other an increment equal to half the spacing between grooves. The bull wheels 24, 26 are not keyed or otherwise fixed to their shafts and hence, although the two wheels on each shaft generally turn synchronously, it is not essential that they so turn. Each bull wheel 24 or 26 has fixed thereto a large diameter sprocket 31L, 31R or 32L, 32R which is connected by means of chains 33 to small diameter sprockets 34, 36 on sleeves 37L, 37R on a pair of aligned, transverse horizontal shafts 38L and 38R journalled in frame members 39 of trailer 11. Sleeves 37L, 37R are connected through tension indicator devices, 41L, 41R hereinafter described in detail, to brake discs 42L, 42R, respectively, concentric with and keyed to shafts 38L and 38R, respectively. Opposite faces of discs 42 are engaged by brake shoes 43 which apply frictional braking force when brought to bear against the discs by expansion of hydraulic cylinder 44 as well understood in the brake art, and the amount of tensions is indicated by tension indicator 41. It will be understood that the braking pressure for each brake disc 42, and hence for each pair of bull wheels 24, 26 on either side of the machine may be separately adjusted by the operator. The brake parts 42, 43, 44 illustrated herein are not described in detail and are subject to wide variation in construction.

Shafts 38L and 38R also carry large diameter sprockets 46 which are connected by chains 47 to sprockets 48 on aligned upper stub shafts 49L, 49R, respectively. Directing attention now to the left-hand side of the machine, upper shaft 49L extends into and is journalled in housing 51L and interiorly of equalizer gear box housing 51L carries gear 52 which meshes with gear 53 on stub shaft 54 also journalled in housing 51L. The outer end of shaft 54 is connected to one end of universal joint connection 56L, the opposite end of universal joint connection 56L being received in telescopic shaft 57 with a spline connection (not shown). Fixed to the exterior of housing 51L is a sprocket 58L concentric with shaft 49L which is connected by chain 59 to sprocket 61 on transverse shaft 62.

Directing attention now to the right-hand side of the machine, right-hand shaft 49R carries sprocket 48 which is connected by chain 47 to sprocket 46 on shaft 38R. As shown in FIG. 3, shaft 49R extends into housing 51R and carries a gear 66 interiorly of housing 51R which meshes with a second gear 67 therein on stub shaft 68. The outer end of stub shaft 68 is connected to one end of universal joint 56R and the opposite end of universal joint 56R is connected with a spline connection to telescopic shaft 57.

Accordingly, normally the two sets of bull wheels 24, 26 turn synchronously and the two conductors 16 or cables are payed out with equal linear velocity. However, occasionally for some reason or other the pulling line or conductors slip relative to each other. Means as hereinafter described is provided to turn left housing 51L about the center of shaft 49L as a pivot and, depending upon the direction of turning of the housing, one set of bull wheels turns relative to the other set and hence any sag of one cable relative to the other may be adjusted. The means whereby housing 51L is turned will be next described. As has been stated, housing sprocket 58 is connected by means of chain 59 to transverse shaft 62. Transverse shaft 62 is driven by a gasoline engine 71 mounted at the forward end of frame 11. Engine shaft 72 drives longitudinal shaft 73 by means of belt 74. A reversing transmission gear box 76 of conventional design is connected to shaft 73 and the driven shaft 77 of said box 76 may be reversed in direction as required by use of gear box control lever 77. The driven shaft carries pulley 78 which, by means of belt 79, drives clutch 81 on the input shaft of a reduction gear box 82 on the left-hand side of the machine. Clutch 81 is manually controlled by lever 83. The output shaft of reduction gear box 82 is shaft 62. Hence, by use of clutch 81 and reverse gear box 76, shaft 49L may be rotated in either direction about its axis while shaft 49R is held stationary, and hence the bull wheels 24L, 26L may be turned relative to bull wheels 24R, 26R.

The output shaft of reverse gear box 76 also drives a second reduction gear box 86 by belt 87 which in turn drives horizontal transverse shaft 88. On the right-hand end of shaft 88 is clutch 89R which is controlled manually by lever 91 and, when engaged, drivingly connects to sprocket 92R. Sprocket 92 is connected by chain 93R to sprocket 94R on shaft 49R. Hence, engine 71 may be used to turn the bull wheels 24R, 26R for various purposes, among which are to rewind the tag ends of conductor 16 back onto a reel winder (not shown) and thence onto a real, or to turn the bull wheels 24R, 26R at the beginning of rotation thereof to overcome static inertia.

Similarly, shaft 88L is connected to clutch 89L, which, when engaged, turns shaft 96 carrying sprocket 92L connected by chain 93L to sprocket 94L on shaft 49L. Thus, the left-hand set of bull wheels 24L, 26L may similarly be turned by engine 71 in either direction to rewind tag ends of conductor or to overcome static inertia.

Normally, conductor 16 is wound around both sets of bull wheels. However, when it is desired to use the machine to string only one conductor, the right-hand side may be immobilized by removing shaft 57. Further, by removing shaft 57, the two sets of bull wheels may be used entirely independently of each other.

Figure 6:
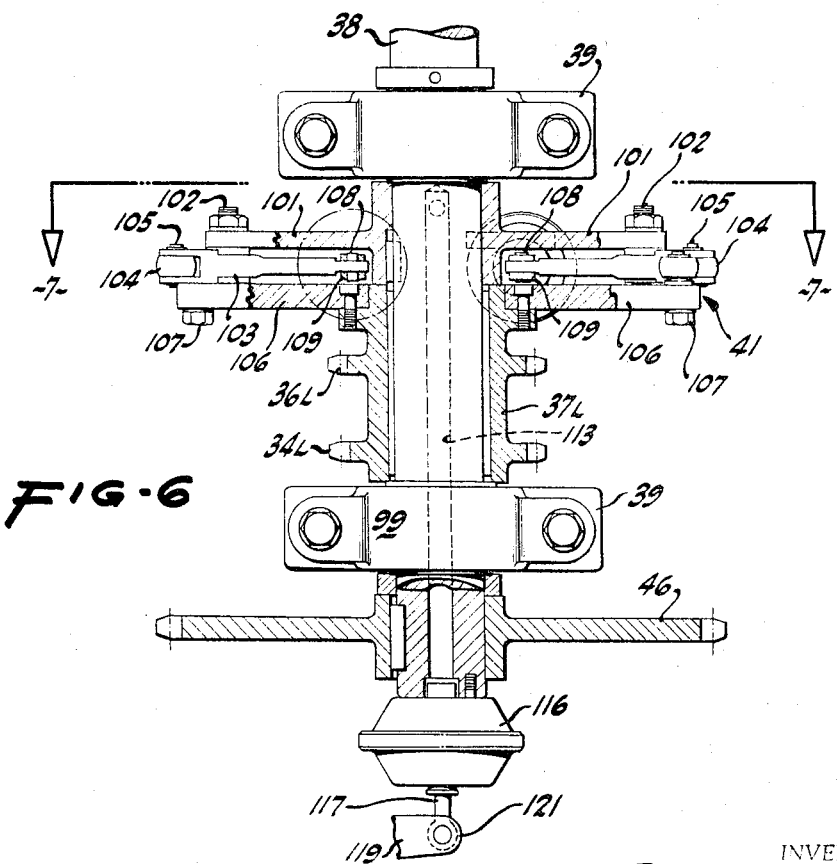
FIG. 6 is a fragmentary sectional view taken substantially along the line 6—6 of FIG. 2.

It is desirable to record or indicate the tension imparted to conductor or cable 16 and hence on either side of the machine there is an indicator 41 suitably installed. Directing attention to FIGS. 6 and 7, it will be seen that sprockets 34, 36 are mounted on sleeve 37 which is concentric with but rotatable relative to shaft 38 mounted in pillow blocks 99 on frame members 39. Sleeve 37 is fixed to oppositely radially disposed arms 106. Keyed to shaft 38 are oppositely radially disposed drive arms 101 to the outer end of each of which is pivoted by means of stud 102, lever 103. The outer end of each lever 103 is clevis-shaped and pivotally connected by pivot 105 to connecting rod 104. The opposite end of rod 104 is pivotally connected by pivot 107 to the outer end of arm 106. The inner end of each lever 103 is pivotally connected by pivot 108 to clevis-shaped outer end of push rod 109 of a diaphragm-type fluid actuator chamber 111. The exterior of chamber 111 is mounted fixed to drive arm 101. Chamber 111 has a diaphragm (not shown) interiorly thereof and the outlet port of said diaphragm is connected by pipe 112 to the hollow core 113 of shaft 38. Hence, pressure inside core 113 depends upon the relative torque between sleeve 37 and shaft 38. The duplication of arms 101, levers 103, drive arms 106 and chambers 111 not only overcomes dynamic imbalance but also tends to dampen out fluctuations of pressure in core 113.

To eliminate rotary fluid connections, another diaphragm-type hydraulic or pneumatic actutaor 116 of the type used on vehicle brakes is mounted on the end of shaft 38. Pressure in the hollow core 113 of shaft 38 is transmitted to the diaphragm of actuator 116, and causes inward or outward movement of push rod 117 which projects outward concentric with shaft 38. Mounted on frame 11 is bracket 118 which pivotally engages rocking lever 119. The fulcrum point of engagement of bracket 118 with lever 119 is adjustable along the length of lever 119 to provide a means of correction of the reading of the indicator or recorder. For such purpose lever 119 is formed with an elongated slot 126. On either side of lever 119 are pads 127 which are adjustably fixed to lever 119 by bolts 128 through slot 126. A pair of links 129 are pivoted at one end to bracket 118 and at their opposite ends to pivot 131 extending through pads 127 and slot 126. By moving pivot 131 longitudinally of slot 126, the relative leverage ratios may be adjusted and hence the reading of the indicator corrected. One end of lever 119 is formed with a clevis 121 which engages the outer end of push rod 117. Hence, in and out movement of rod 117 responsive to pressure in core 113 causes rocking movement of lever 119. The opposite end of lever 119 engages push rod 122 of a third actuator 123 similar to the other such actuators. The output of actuator 123 is transmitted by piping (not shown) to a gauge (not shown) on the control panel of the machine. Such gauge gives an accurate reading of the tension under which the conductor is being payed out.

OPERATION

In use, the tensioner is located at one end of a portion of a transmission line. A pair of cables 16 wound on reels are fed into the machine, preferably from a reel carrier on which the reels are mounted. Each cable passes around wheels 24 and 26, one on the left-hand and the other on the right-hand side of the machine. The cables then pass up to the first sheaves on the cross-arms of the first transmission tower or pole of the line, and thence from sheave to sheave to the end of that portion of the line being strung, where the cable passes around a tension puller, thence to a reel winder which rewinds it onto reels for reuse. The end of each cable is attached to the end of the conductor to be strung and the conductor follows the same path as the pulling cable until it reaches the puller machine whereupon the pulling operation is discontinued.

It will be understood that normally the two cables or conductors are pulled at the same linear velocity but it sometimes occurs that through slippage or other accident one cable or conductor moves ahead of the other, whereupon a sag is created in one line and an excessive pulling force in the other. The present invention has as one of its principal functions to eliminate the excessive sag so that the two lines are payed out under equal tension.

At the commencement of the unwinding operation, or whenever for some reason the movement of the cable has been interrupted, power is transmitted from prime mover 71 through clutches 89L and 89R to sprockets 94L and 94R and thus to the bull wheels 24, 26 themselves, so that part of the static inertia of the bull wheels is overcome and the paying out of the cable or conductors is facilitated and undue strain on the pulling cable or conductor is avoided. This feature of the operation also tends to overcome any locking of the brake shoes 43 against the discs 42. As soon as the cable or conductor is moving, clutches 89 are disengaged and the turning of the bull wheels is accomplished by the tension puller at the other end of the line.

As the conductors are being payed out, the operator adjusts the pressure in brake cylinders 44 so that the desired braking effort is applied. The result of such braking may be observed by the tension recorder or indicator 41. The torque between arms 106 and 101 fixed for rotation with the brake disc and bull wheels respectively varies the pressure within cylinder 111 and the variations in pressure are read on an indicator gauge visible to the operator in a manner heretofore explained. Hence, the brake cylinders 44 are adjusted in pressure to maintain the tension on the two cables equal to each other and also equal to the predetermined desired tension.

If, as has been explained, one of the cables or conductors sags relative to the other, power from prime mover 71 is transmitted through clutch 81 to sprocket 58L on casing 57. The direction of turning movement of the sprocket is controlled by reversing gear box 76. As sprocket 58 revolves in either direction about the axis of gear 52 and shaft 49L the left-hand set of bull wheels 24L, 26L turns relative to the set 24R, 26R although both sets of wheels are turning. The turning movement of casing 57 is continued until the sag in one of the cables is eliminated, whereupon prime mover 71 is disengaged. Except when casing 57 is turning, by reason of the iterconnection of shafts 49R and 49L through telescopic shaft 57, the two sets of bull wheels turn synchronously.

At the conclusion of the stringing operation it sometimes occurs that there is a portion of conductor remaining on the bull wheels or on the ground after the conductor has been cut off to size. The machine which is the subject of this invention may be used to pull in the tag ends of the conductor for rewinding back onto reel winder and ultimately onto the reels for salvage. For such purpose, prime mover 71 is reversed in normal direction for starting, as has heretofore been explained, by reversal of gear box 76 and upon engagement of either or both of clutches 89L, 89R the bull wheels may be reversed from normal direction of rotation for the rewinding operation.

The present invention has been described for use in stringing two conductors together. It is apparent that the machine may be adapted for stringing more than two conductors by addition of more bull wheels and transmission members between the prime mover 71 and the various wheels. Furthermore, the machine herein illustrated may be used when desired to string a single conductor. In such use, the single conductor is reeved around the left-hand wheels 24L, 26L and shaft 57 is removed. Braking pressure is applied to brake disc 42L and the wheels 24R, 26R remain stationary. Additionally, with shaft 57 removed, wheels 24R, 26R may be used entirely independently of wheels 24L, 26L.

Other objects of the present invention will become apparent upon reading the following specification and referring to the accompanying drawings in which similar characters of reference represent corresponding parts in each of the several views.

What is claimed is:

1. A tension indicator comprising a first rotatable means, a second rotatable means co-axial with said first means, brake means applying braking force to said first means, power means rotating said first means, a first arm fixed for rotation with said first means, a second arm fixed for rotation with said second means, a lever pivotally mounted on one said arm about a fulcrum, a fluid pressure cylinder on said last-mentioned arm and having a drive rod, means interconnecting said drive rod and said lever, means interconnecting the other said arm to said lever, motion of said drive rod relative to said cylinder being responsive to pressure in said cylinder resisting relative rotation of said arms, and indicating means indicating said pressure.

2. An indicator according to claim 1 in which one said rotatable means comprises a hollow shaft on which one said arm is mounted, and which further comprises means for communicating pressure in said cylinder to the interior of said shaft, and deformable means on one end of said shaft deformable responsive to pressure in the interior of said shaft, and in which said indicating means is connected to said deformable means.

3. An indicator according to claim 2 in which said indicating means is non-rotatable relative to said shaft.

4. An indicator according to claim 2 in which said indicating means comprises a second lever, fulcrum means for pivotally mounting said second lever to a stationary support, and means interconnecting said deformable means to one end of said second lever and gauge actuating means connected to the opposite end of said second lever.

5. An indicator according to claim 4 in which said fulcrum means is adjustable in poistion along the length of said second lever.

References Cited by the Examiner

UNITED STATES PATENTS 2,210,759  8/1940  Hansen _____ 73—143

FOREIGN PATENTS 6,454  of 1914  Great Britain.

RICHARD C. QUEISSER, *Primary Examiner.*

CHARLES A. RUEHL, *Assistant Examiner.*